Dec. 29, 1970   J. L. VAN GULIK   3,551,786
CIRCUIT FOR ADJUSTABLY INCREASING OR DECREASING
THE CHARGE ON A CAPACITOR
Filed Dec. 5, 1967   2 Sheets-Sheet 1

JOHAN L. VAN GULIK
INVENTOR

BY
BUCKHORN, BLORE, KLARQUIST & SPARKMAN
ATTORNEYS

United States Patent Office 3,551,786
Patented Dec. 29, 1970

3,551,786
CIRCUIT FOR ADJUSTABLY INCREASING OR
DECREASING THE CHARGE ON A CAPACITOR
Johan L. Van Gulik, Lake Oswego, Oreg., assignor to
Omark Industries, Inc., Portland, Oreg., a corporation
of Oregon
Filed Dec. 5, 1967, Ser. No. 688,206
Int. Cl. G05f 1/56, 1/60
U.S. Cl. 323—22
14 Claims

ABSTRACT OF THE DISCLOSURE

A voltage regulating circuit for a capacitor used in welding includes a silicon-controlled rectifier which is normally activated to charge the capacitor. When the capacitor is charged to a predetermined voltage level, shunting means removes the cotrol voltage from the rectifier's gate electrode whereby charging is discontinued. A Zener diode connects the shunting means to an adjustable voltage divider coupled across the capacitor for selecting a desired charging level. Also, a shunting circuit under the control of the adjustable voltage divider is disposed across the capacitor for lowering the capacitor voltage when desired.

BACKGROUND OF THE INVENTION

A successful apparatus used in stud welding includes a capacitor which is discharged between a stud tip and a workpiece, melting the stud tip and producing a strong weld between stud and workpiece. It is of advantage to be able to adjust the voltage to which the capacitor is charged according to the size of the stud, and materials employed. Prior voltage-adjustable arrangements have included mechanical relays and the like which act to disconnect the capacitor when a predetermined charge level is reached. Such arrangements tend to be complex and expensive. Electronic schemes for disconnecting a source when a predetermined voltage level is reached have also been proposed, but frequently involve relatively complex triggering circuitry and the like. Moreover, although prior schemes for capacitor charging have accomplished the charging of capacitors to a predetemined level, most arrangements cannot readily reset the capacitor to a lower voltage level without first discharging the capacitor and charging it over again.

SUMMARY OF THE INVENTION

In accordance with the present invention, a regulation circuit for charging a capacitor includes a controllable switching means, for example a silicon-controlled rectifier, for receiving a periodically recurring voltage, and delivering at least a portion thereof to a load. The controllable switching means is normally activated by means for applying a control voltage to its control electrode during each repetition of the periodically recurring voltage. However, when the output voltage on the capacitor reaches a predetermined level, the means for applying the control voltage to the switching mean's control electrode is effectively shunted whereby the switching means no longer operates. A constant voltage dropping means couples a proportion of the output or capacitor voltage to said means for applying a control voltage to the switching mean's control electrode whereby conductivity is discontinued at the proper voltage level. According to a preferred embodiment of the present invention, the constant voltage dropping means is connected to an adjustable voltage divider wherein the same adjustable voltage divider also operates a shunting means across the capacitor. The capacitor voltage can then be lowered by the same control used in presetting the capacitor voltage.

It is accordingly an object of the present invention to provide an improved, simplified, and reliable voltage adjusting device for a capacitor charging circuit.

It is another object of the present invention to provide improved regulating apparatus for charging a capacitor to a predetermined adjustable voltage level, and for selectively discharging the capacitor by means of the same adjustment.

It is another object of the present invention to provide a simplified electronic capacitor charging circuit for providing an adjustable voltage charge on a capacitor where, in the circuit is of economical construction requiring a small number of components.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
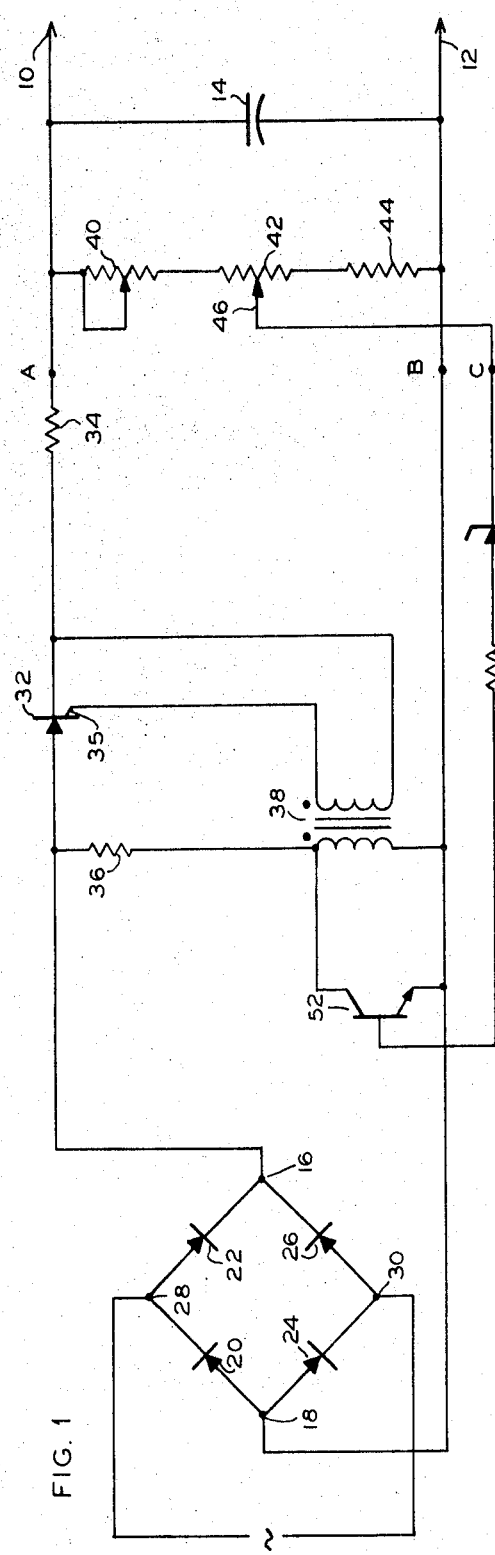
FIG. 1 is a schematic diagram of a first embodiment of an adjustable capacitor charging circuit according to the present invention.

Referring to the drawings, and particularly to FIG. 1, a welding circuit includes output or load terminals 10 and 12 for connection to a stud welding gun or the like and between which is connected a welding capacitor 14. The charging current is derived from terminals 16 and 18 which will herein be described as input terminals. Terminal 18 forms a common voltage reference connection or ground connection with terminal 12. Terminals 16 and 18 are connected to either end of a bridge rectifier including diodes 20, 22, 24, and 26. The diodes are interconnected in the usual bridge circuit fashion for receiving an alternating current input at terminals 28 and 30 and providing a full wave rectified output between terminal 16 and 18. A pulsating or periodic voltage wave is thereby provided between terminals 16 and 18.

Terminal 16 is coupled to output terminal 10 through a controllable switching means here comprising a silicon-controlled rectifier 32 having its anode terminal connected to input terminal 16 and having its cathode terminal coupled to output terminal 10 through charging resistor 34. Resistor 34 is included in the circuit so that the charging current for capacitor 14 will be predetermined and will not reach an inordinately high value. Usually resistor 34 has a value between 2 and 10 ohms.

Also coupled between input terminals 16 and 18 is a series circuit including an impedance comprising resistor 36 and the primary of transformer 38 in that order. The secondary of transformer 38 is coupled between the gate and cathods electrodes of silicon-controlled rectifier 32. The transformer secondary is connected so that a positive going wave is applied to the gate electrode of silicon-controlled rectifier 32 at the same time as the positive going wave is applied to the anode electrode thereof.

Thus, transformer 38 comprises means for normally applying a control value to the control electrode of the silicon-controlled rectifier for normally causing conduction thereof during each repetition of the periodically recurring input voltage. Transformer 38 typically has a 10 to 1 primary to secondary turns ratio. Utilization of the transformer enables return of the secondary winding thereof to the silicon-controlled rectifier cathode rather than to ground, enabling a wider range of control in capacitor voltage.

A voltage divider comprising potentiometers 40 and 42 and resistor 44 is connected across capacitor 14, that is, from terminal 10 to terminal 12. The adjustable tap 46 of potentiometer 42 is coupled through a zener diode 48 and current limiting resistor 50 to the base of a silicon NPN transistor 52. Transistor 52 comprises means for effectively shunting the control voltage applied at gate electrode 35 of silicon-controlled rectifier 32. The emitter of transistor 52 is connected to terminal 18 and its collector is connected to the remaining terminal of the transformer 38 primary.

According to the operation of the FIG. 1 circuit, as the periodically recurring input voltage is delivered between terminals 16 and 18, silicon-controlled rectifier 32 is caused to conduct during each half cycle thereof, and delivers charging current to the capacitor load through resistor 34. The voltage across capacitor 14 causes a current flow in the voltage divider comprising potentiometers 40 and 42 and resistor 44 whereby a voltage is provided at the movable tap 46 of potentiometer 42 depending upon the placement of such tap. The zener diode 48 comprises constant voltage dropping means which allows the voltage at the base of transistor 52 to be below the transistor's emitter voltage for low values of current in the voltage divider. As capacitor 14 charges, and the voltage at tap 46 exceeds the zener voltage of zener diode 48 with respect to ground, a small current starts to flow through diode 48 to the base of transistor 52 causing conduction between the collector and emitter electrodes of transistor 52 for reducing the voltage across the primary of transformer 38. Therefore, the voltage at gate electrode 35 is reduced in value, and a triggering of silicon-controlled rectifier 32 into a conductive state is delayed. As the voltage across capacitor 14 further increases, the triggering of silicon-controlled rectifier 32 is delayed to a greater extent until conduction thereof substantially ceases altogether. Use of the transistor as a shunting means provides smooth and accurate control of the capacitor voltage.

The voltage which capacitor 14 reaches before the supply of current thereto is shut off may be selected by adjustment of movable tap 46 on potentiometer 42 or by adjustment of the movable shunting tap provided on potentiometer 40. In practice, positioning of the tap of potentiometer 40 produces a greater degree of adjustment and controls the range of voltage selected by movable tap 46.

In the foregoing circuit, the value of resistor 36 is chosen such that with transistor 52 non-conducting, the voltage provided gate electrode 35 is sufficient to trigger silicon-controlled rectifier 32 in the early part of a half wave of input voltage. The value should also be chosen so that if capacitor 14 is charged with maximum voltage and if transistor 52 ceases to conduct, silicon-controlled rectifier 32 would still be triggered during the latter part of the cycle. Of course, resistor 36 is necessary so that the input voltage supply terminals will not be shunted at any stage of circuit operation by the shunting action of transistor 52.

Figure 3:
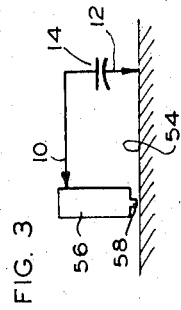
FIG. 3 illustrates utilization of capacitor charge in stud welding.

The FIG. 1 circuit is suitably employed as means for charging a capacitor for delivering large currents for welding purposes. FIG. 3 illustrates an example arrangement wherein capacitor 14 is connected between a workpiece or plate 54 and a stud 56 which in this case is to be welded to plate 54. Stud 56 is provided with a tip 58 of reduced diameter which is sutiably disposed in spaced relation to plate 54. Assuming capacitor 14 has been charged by the circuit of the present invention to a predetermined voltage level and is then connected as illustrated in the FIG. 3 circuit, an arc discharge will be established between tip 58 and plate 54 which vaporizes or melts the tip as well as a corresponding area on plate 54. The stud is then pressed into the molten metal for resulting in a strong weld therebetween. The weld is characterized by absence of distortion of the workpiece on plate 54 and stud 56.

Figure 2:
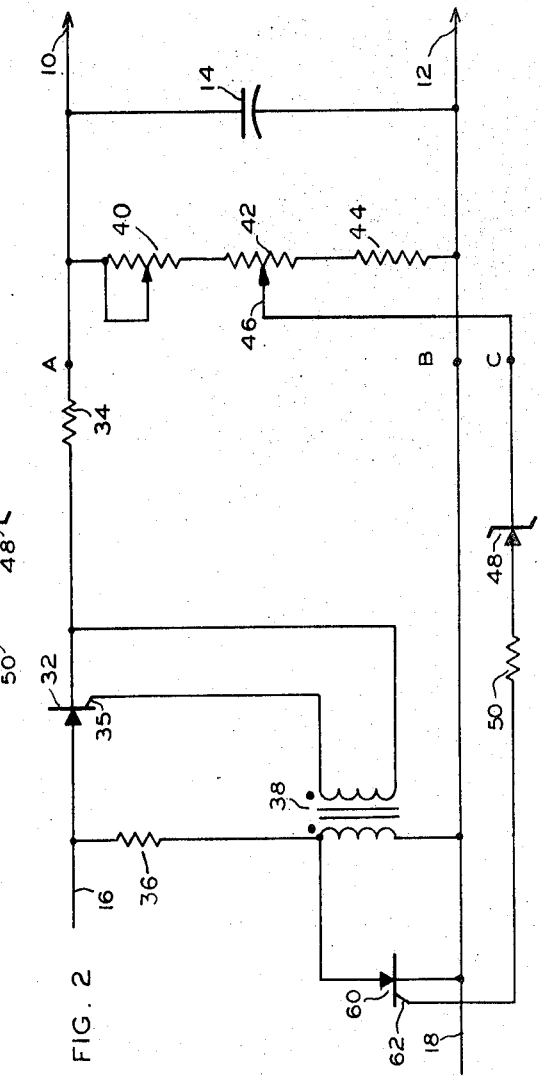
FIG. 2 is a schematic diagram of a second embodiment of an adjustable capacitor charging circuit according to the present invention.

FIG. 2 illustrates a circuit similar to the FIG. 1 circuit, wherein similar elements are indicated by similar reference numerals. In the FIG. 2 circuit, the transistor 52 of FIG. 1 is replaced with a second silicon-controlled rectifier 60 disposed across the primary of transformer 38 acting as means for shunting the control voltage normally applied to gate electrode 35 of silicon-controlled rectifier 32. In this circuit, when the voltage across capacitor 14 reaches a predetermined value, the voltage at tap 46 of potentiometer 42, as dropped by zener diode 48, is sufficient to trigger operation of silicon-controlled rectifier 60, the zener diode being coupled to gate electrode 62 through limiting resistor 50. The zener diode 48 is again employed to drop the voltage level derived at movable tap 46 to a point where conduction of silicon-controlled rectifier 60 will take place only when a selected proportion of the desired capacitor voltage appears at movable tap 46. For lower values, zener diode 48 does not allow gate 62 to rise above ground level. It is understood that although a full wave rectified voltage may be provided at input terminals 16 and 18, an A.C. input may be similarly provided because of the rectifying action of the silicon-controlled rectifiers.

Figure 4:
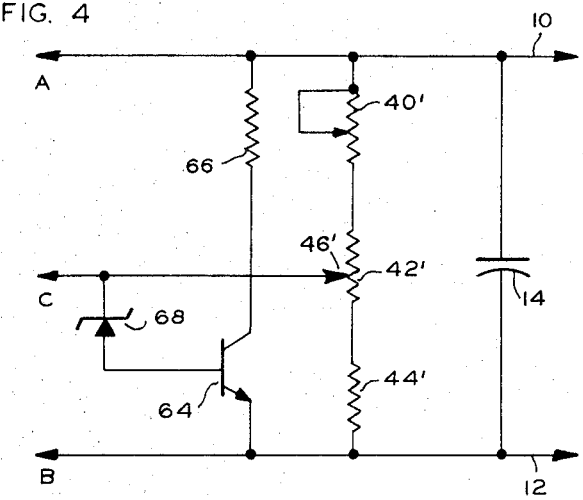
FIG. 4 is a schematic diagram of an extension of the circuit according to the present invention for selectively reducing the charge on the capacitor.
Figure 5:
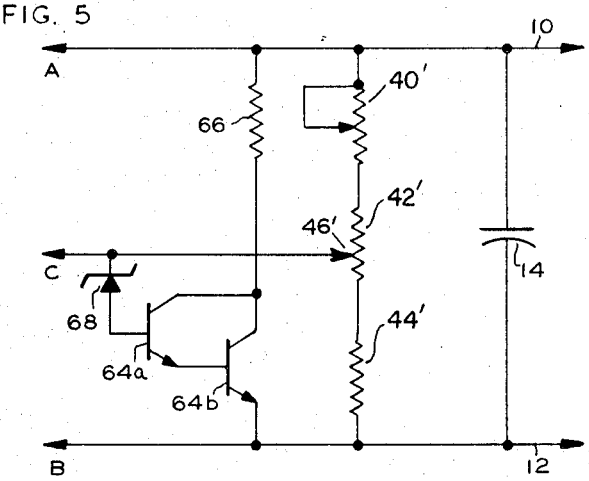
FIG. 5 is a schematic diagram of a variation of the FIG. 4 circuit.

Additional circuitry preferably included according to the present invention is illustrated in FIGS. 4 and 5. Referring particularly to FIG. 4, a circuit portion is illustrated which may be advantageously substituted for the portion of the FIG. 1 circuit to the right of terminals A, B, and C. In this circuit, a control device comprising an NPN transistor 64 has its emitter electrode connected to ground or output terminal 12, and its collector electrode coupled through an impedance comprising resistor 66 to output terminal 10. A voltage divider comprising potentiometers 40' and 42', and resistor 44' corresponds to the similarly indicated voltage divider of FIGS. 1 or 2, the movable tap 46' being connected to zener diode 48 by way of terminal C. The movable tap 46' of potentiometer 42' is here also connected to the cathode of zener diode 68, the anode of which is connected to the base of transistor 64. Zener diode 68 should have a zener voltage somewhat greater than the zener voltage of diode 48 for the circuit to operate properly.

In this circuit, not only does adjustment of the movable tap 46' of poteniometer 42' select the voltage to which capacitor 14 will be charged, but also the same control may be employed to reduce the voltage across capacitor 14 after charging. For example, suppose the movable tap 46' is moved to a higher voltage value, or alternatively, suppose the movable tap of potentiometer 40' is moved in a direction for shunting more of the resistance of potentiometer 40'. As a result, the voltage to which capacitor 14 may rise without causing shunting of the primary of transformer 38 and disconnection of rectifier 32 will be reduced. However, assuming capacitor 14 has already been charged, a similar change in the controls will cause the voltage across diode 68 to be raised above its zener voltage whereby zener diode 68 conducts and switches on transistor 64. Capacitor 14 will then be discharged through resistor 66 and transistor 64 until a new selected voltage level is reached. The voltage across capacitor 14 may be reduced thereby without substantially completely discharging such capacitor and then recharging the same to a selected value. The same adjustable voltage divider means is employed in either case, but the shunting circuit of FIG. 4, substantially disposed across the output or capacitor terminals, shunts the capacitor at a slightly higher voltage value due to the higher zener voltage of diode 68. The FIG. 4 circuit normally drains no power from the power source, for example during capacitor charging, because of the higher zener voltage of diode 68.

Referring to FIG. 5, a circuit similar to FIG. 4 is illustrated, the FIG. 5 circuit including similar components referred to by like reference numerals and operating in a similar manner. In the FIG. 5 circuit, a pair of transistors 64a and 64b are substituted for the control device or transistor 64 of FIG. 4. Zener diode 68 is connected to the base electrode of transistor 64a with the emitter if transistor 65a being connected to the base of transistor 64b. The emitter of transistor 64b is connected to output terminal 12, or ground, while the collectors of both the transistors are coupled to output terminal 10 through resistor 66. In this circuit, a high input impedance is provided to Zener diode 68 with less drive current being required for transistor 64a. Less leakage current from the capacitor 14 will then take place when the capacitor voltage is at a desired value. In this circuit, transistor 64a may be of a smaller current rating than transistor 64b. For example, transistor 64b may be a power transistor.

I claim:

1. A regulation circuit for a capacitive load, said, circuit comprising:
   controllable switching means for receiving a periodically recurring voltage and delivering at least a portion thereof to a load circuit including a capacitor,
   means for normally activating said controllable switching means during each repetition of said periodically recurring voltage,
   voltage divider means coupled across said capacitor, said voltage divider means having an adjustable tap for developing an adjustable proportion of the voltage appearing across said capacitor,
   means under the control of said adjustable proportion of the capacitor voltage for inhibiting the operation of the means for normally activating said controllable switching means when the capacitor charges to a voltage having a predetermined value,
   and means also under the control of said adjustable proportion of said capacitor voltage for shunting said capacitor to discharge the capacitor partially when the capacitor voltage exceeds a predetermined value.

2. Regulating apparatus for a capacitive load, said apparatus comprising::
   controllable switching means for receiving a periodically recurring input voltage and applying at least a D.C. portion of the same to a load circuit under the control of a control electrode, said load circuit including a capacitor,
   means for normally applying a control value to said control electrode during each repetition of said periodically recurring input voltage for causing conduction of said controllable switching means during each reptition of such periodically recurring input voltage,
   potentiometer means coupled across said capacitor for adjustably providing a selected proportion of the capacitor voltage,
   means responsive to said selected proportion of said capacitor voltage for effectively shunting said control value when said capacitor voltage rises to a predetermined value,
   and means also responsive to said selected proportion of said load voltage for shunting said capacitor at a higher value of capacitor voltage.

3. The apparatus according to claim 2 wherein said controllable switching means comprises a silicon-controlled rectifier, and wherein said control electrode comprises the gate electrode thereof.

4. The apparatus according to claim 3 wherein said means for normally applying a control value to said control electrode for causing conduction of said controllable switching means includes a transformer receiving a control input proportional to said input voltage and providing a control output for application to said gate electrode.

5. The apparatus according to claim 2 wherein a first zener diode is coupled in series between the tap of said potentiometer means and said means for shunting said control value,
   and a second zener diode is coupled in series between said tap of of said potentiometer means and said means for shunting said capacitor.

6. The apparatus according to claim 2 wherein said means for shunting said capacitor comprises transistor means coupled across said capacitor, and further including a zener diode coupled between said potentiometer means and an input terminal of said transistor means.

7. The apparatus according to claim 6 wherein said transistor means comprises a first transistor having its collector-emitter path coupled across said capacitor, and a second transistor having its emitter coupled to the base of said first transistor with the base of said second transistor comprising the input terminal of said transistor means.

8. Regulating apparatus for a capacitive load, said apparatus comprising:
   a silicon-controlled rectifier for receiving a periodically recurring input voltage and applying at least a D.C. portion of the same to a load circuit under the control of a gate electrode, said load circuit including a capacitor, said input voltage and said capacitor having a common circuit reference point,
   means for normally applying a control valve to said gate electrode during each repetition of said periodically recurring input voltage for causing conduction of said silicon-controlled rectifier during each repetition of such periodically recurring input voltage,
   voltage divider means coupled across said capacitor, said voltage divider means having an adjustable tap for developing a selected proportion of the voltage appearing across said capacitor, and constant voltage dropping means coupled to said tap,
   means responsive to said selected proportion of said capacitor voltage and coupled to receive said selected proportion of capacitor voltage via said constant voltage dropping means for effectively substantially removing said control value when said capacitor voltage reaches a predetermined value,
   and means also under the control of said selected proportion of the capacitor voltage for shunting said capacitor.

9. The apparatus according to claim 8 wherein said constant voltage dropping means comprises a zener diode.

10. A regulation apparatus for a capacitive load comprising:
    a pair of voltage receiving input terminals,
    a controllable switching means having principal terminals for coupling between a first said apparatus input terminal and a first terminal of said load with the remaining input terminal of said apparatus being connected to the remaining terminal of said load, said controllable switching means also having a control terminal,
    a transformer provided with an input winding having one terminal thereof connected to said remaining input terminal, and an impedance connecting the other terminal of said winding to the first input terminal of said apparatus,
    said transformer having an output winding connected in operative relation to the conrtol terminal of said controllable switching means,
    controllable shunting means connected across the input winding of said transformer, said shunting means being provided with a cotrol terminal,
    voltage divider means coupled across said load, said voltage divider means having an adjustable tap for developing a selected proportion of the output voltage of said apparatus, a first zener diode for applying said selected proportion of the output voltage of said apparatus to the control terminal of said shunting means to operate said shunting means at a predetermined load voltage, means also under the control of said selected proportion of the output voltage for discharging said capacitive load, and a second zener diode connected between said tap and said last mentioned means.

11. The apparatus according to claim 10 wherein said controllable switching means comprise a silicon-controlled rectifier.

12. The apparatus according to claim 10 wherein said controllable shunting means comprises a silicon-controlled rectifier having principal terminals connected across the input windings of said transformer.

13. The apparatus according to claim 10 wherein said controllable shunting means comprises a transistor having its collector-emitter path coupled across the input winding of said transformer, and wherein said control terminal comprises the base electrode of said transistor.

14. The apparatus according to claim 11 wherein said output winding of said transformer is connected between the gate terminal of said silicon-controlled rectifier and the cathode terminal of said silicon-controlled rectifier.

References Cited

UNITED STATES PATENTS

| | | | |
|---|---|---|---|
| 3,124,697 | 3/1964 | Trenchard | 323—22X(T) |
| 3,302,128 | 1/1967 | Schoemehl et al. | 323—22UX(SCR) |
| 3,321,692 | 5/1967 | Walsh | 323—22X(SCR) |
| 3,412,314 | 11/1968 | Crane | 321—16 |
| 3,427,528 | 2/1969 | Custer | 321—18 |
| 3,439,253 | 4/1969 | Piteo | 321—18 |
| 3,005,147 | 10/1961 | Thomas | 323—9 |

OTHER REFERENCES

Silicon Zener Diode and Rectifier Handbook, Motorola, Inc., Semiconductor Products Division, Phoenix, Ariz., Second Edition 1961, pps. 36, 38, TK7872S4M66.

WILLIAM M. SHOOP Jr., Primary Examiner

A. D. PELLINEN, Assistant Examiner

U.S. Cl. X.R.

219—98; 321—18; 323—38